United States Patent [19]

Murphy

[11] Patent Number: 5,049,018

[45] Date of Patent: Sep. 17, 1991

[54] FASTENER FOR GRIPPING A SUBSTRATE MATERIAL

[75] Inventor: Colin Murphy, Dover, N.J.

[73] Assignee: Engineered Construction Components, Panama City, Panama

[21] Appl. No.: 566,301

[22] Filed: Aug. 10, 1990

Related U.S. Application Data

[63] Continuation of Ser. No. 396,443, Aug. 21, 1989, abandoned.

[51] Int. Cl.⁵ .............................................. F16B 15/00
[52] U.S. Cl. ..................................... 411/447; 411/913
[58] Field of Search ............... 411/456, 447, 454, 487, 411/378, 492, 392, 398, 411, 424, 425, 913, 916, 439, 466, 259, 260, 261, 446, 508, 352, 353; 403/405.1; 405/259

[56] References Cited

U.S. PATENT DOCUMENTS

| | | | |
|---|---|---|---|
| 623,427 | 4/1899 | Richards et al. | 411/352 |
| 1,417,818 | 5/1922 | Frost | 411/456 |
| 1,519,502 | 12/1924 | Nalle | 411/547 X |
| 1,574,790 | 3/1926 | Carroll | 411/456 X |
| 1,798,273 | 3/1931 | Pleister | 411/439 X |
| 2,006,813 | 7/1935 | Norwood | 411/352 |
| 2,222,338 | 11/1940 | Roberts | 411/446 |
| 2,501,701 | 3/1950 | Tinnerman | 411/449 |
| 3,093,874 | 6/1963 | Rapata | 411/508 |
| 3,204,265 | 9/1965 | Fiekers et al. | 411/456 X |
| 3,596,940 | 5/1952 | Poupitch | 411/508 |
| 3,959,853 | 6/1976 | Talan | 411/913 X |
| 4,014,244 | 3/1977 | Larson | 411/451 X |

FOREIGN PATENT DOCUMENTS

| | | | |
|---|---|---|---|
| 670751 | 6/1979 | U.S.S.R. | 411/508 |
| 428420 | 5/1935 | United Kingdom | 411/456 |

*Primary Examiner*—Rodney M. Lindsey
*Attorney, Agent, or Firm*—Elliot M. Olstein; Raymond J. Lillie

[57] ABSTRACT

A fastener having a head portion, a shaft portion, and a hook portion which secures the fastener within a substrate. The hook portion may have a plurality of serrations on a surface thereof for gripping a substrate. The hook may be of a material having a memory such that, when the hook is compressed during the insertion of the fastener in a hole in a substrate, the hook will expand against the walls of the hole in a desire to return to its original shape. Such a fastener may be easily inserted into the hole, but considerable force is required to remove the fastener from the hole after insertion. The fastener thus can be inserted easily through soft materials overlying a hard substrate without damaging them while providing an effective anchoring force within the substrate in effectively fastening materials to a substrate.

4 Claims, 1 Drawing Sheet

FASTENER FOR GRIPPING A SUBSTRATE MATERIAL

This application is a continuation of application Ser. No. 396,443 filed Aug. 21, 1989, now abandoned.

This invention relates to anchors, or fasteners, for fastening or anchoring a material (e.g., roofing insulation and/or membranes) to a substrate (e.g., a roof deck). More particularly, this invention relates to anchors or fasteners having means for gripping a substrate material. In addition, this invention also relates to anchors or fasteners which are easily inserted into a substrate, yet difficult to remove from the substrate.

An anchor or fastener is employed in order to fasten a material to a substrate. The substrate may be, for example, a wall or a roof deck, made of a hard material such as concrete, stone, plaster, or wood. The material to be fastened to the substrate may be for example, a roof membrane and/or roofing insulation which is fastened to a roof deck, or a fixture which is fastened to a wall.

One example of an anchor is an assembly which includes an expansible shell or sleeve, and a bolt contained in the sleeve. The anchor is inserted into a pre-drilled hole in a concrete wall or roof deck, for example. Once the anchor is inserted through the material to be fastened and into the hole, the bolt is turned by a wrench which causes the shell or sleeve to expand. The shell thus grips the wall of the hole to retain the bolt securely within the hole as a static anchor. If the hole size increases the anchor comes loose. There is no compensation for hole size increase during normal use.

Another example of an anchor is a single piece anchor having a shank and an intermediate section split into two half-sections having a semi-circular cross-section. The two half-sections are expanded in opposite directions in the plane of the split. The unsplit diameter of the shank is smaller than the hole into which the anchor is inserted, and the maximum diameter of the split section is somewhat greater than that of the hole. When such an anchor is driven into a drilled hole, the expanded half sections are compressed inwardly and straightened out. The expanded half sections thus exert an anchoring force on the wall of the hole on opposite sides of the wall. An example of such an anchor is the Rawl Drive, sold by the Rawlplug Company, Inc., of New Rochelle, N.Y.

U.S. Pat. No. 4,828,445, issued to Giannuzzi, discloses a one-piece anchor having a deformed shank. When the shank is driven into a hole, the shank's original deformity or deformities become forcibly deformed. The memory of the shank is such, however, that when the shank is forcibly deformed, the shank seeks to maintain its original shape. By seeking to maintain its original shape, the shank exerts pressure on the wall of the hole and is able to keep a fixture or other object anchored to the substrate.

Anchors such as those hereinabove described, however, require considerable force in order to enable such anchors to be driven satisfactorily into a hole. If one wishes to fasten a soft substance to a hard substance, the force employed in driving the anchor may be such that unacceptable damage is caused to the soft material. For example, when one attempts to fasten a roof membrane and/or insulation to a concrete roof deck, the membrane and/or the insulation may become unacceptably torn as a result of the force applied in order to drive the anchor into the concrete, thus requiring that the membrane and/or insulation be replaced.

The hereinabove described anchors while being driven into a substrate may also chip the wall of the hole in the substrate, or put grooves in the hole. Such grooves and/or chipping may widen the hole or lessen the depth in the substrate and loosen the anchor within the hole such that the anchor no longer is effective in fastening or anchoring a material to a substrate, or may even fall out of the hole, if the anchor has been placed in a wall or ceiling. In the case where an anchor is used to fasten a roof membrane and/or insulation to a concrete roof deck, chipping of the concrete surrounding the hole may decrease the depth and reduce the tensile pull-out value of the anchor within the hole. The anchor then may not be effective in holding the membrane and/or insulation against the roof deck, thus making the membrane susceptible to wind uplift. Such wind uplift pulls the membrane from the roof deck, and if sufficiently severe, may remove the anchor from the hole. This wind uplift can also cause the anchor to lift slightly and reduce the compression on the membrane and/or insulation. An anchor that requires the same force to enter that it does to withdraw could be pulled slightly from the pre-drilled hole.

It is therefore an object of the present invention to provide an anchor or fastener which does not, through driving of the anchor into a hole, chip or groove the hole, no matter what the depth and thus secure the anchor effectively within the hole.

It is also another object of the present invention to provide an anchor which, when employed to fasten a soft substance to a hard substance, will not cause unacceptable or irreparable damage to the soft substance as the anchor is driven through the soft substance.

In accordance with an aspect of the present invention, there is provided a one-piece fastener which comprises a head portion, a shaft portion, and a hook portion at the end of the shaft portion, wherein the hook portion has an upwardly and outwardly extending resilient end portion. The end portion has an end surface which is adapted to provide gripping contact with a wall of a hole in a substrate into which the fastener is inserted. In a preferred embodiment, the end surface includes at least one serration, or preferably, a plurality of serrations. The serration(s) grip the substrate upon insertion of the fastener into the substrate such that the fastener will not become dislodged from the substrate.

The hook portion may be of a flat, or rectangular, or round, or oval cross-section. When the hook portion has a round cross-section, it may have a width, or diameter, which is about 40% of the width or diameter of the shaft portion. An oval cross-section is preferred because such a cross-section provides for facilitated insertion of the fastener into the hole in the substrate, while providing for optimized gripping contact of the end surface of the hook portion with the wall of the hole in the substrate to maintain sufficient gripping contact with the wall of the hole to secure the fastener in the hole.

In another embodiment, the fastener may have a coating in an amount effective to prevent corrosion of the fastener. Examples of coatings which may be employed are xylan or other organic coatings. The use of grit and/or sand will increase the gripping ability of the fastener.

In accordance with another aspect of the present invention, there is provided a fastener comprising a head portion, a shaft portion, and a resilient hook portion. The hook portion when deformed is capable of exerting a sufficient force against the wall of a hole in the substrate so as to enable the fastener to be anchored within the hole. In a preferred embodiment, the hook portion includes curved surfaces for providing one or more gripping surfaces in addition to the gripping surface at the end of the hook portion.

In a preferred embodiment, the hook portion has a cross-sectional area less than that of the shaft portion. Although the cross-sectional area of the hook portion is generally less than that of the shaft portion, the total width of the fastener at the hook (hook portion and shaft) is greater than the width of the shaft portion.

The fastener, which includes the hook portion, may be made of a material having a high degree of memory and capable of being shaped or bent without rupturing the material or altering its resilient or spring-like properties at the hook portion. The hook portion, therefore, will have a memory such that, when the shaft is inserted into a hole in the substrate, the hook portion may be slightly compressed as it is inserted into the hole, said hole having a diameter slightly less than that of the total width of the fastener at the hook portion. However, upon compression, the hook portion will seek to return to its original shape, thereby exerting a force against the wall of the hole. Such force is sufficient to enable the fastener to be anchored within the hole. Materials of which the fastener may be made include metals such as carbon or stainless steel, or aluminum; or carbon; or nylon; or polyolefin. A metal fastener may be heat treated in order to provide the hook portion with a memory by tempering the metal at an appropriate temperature.

The hook portion may be of a flat, or rectangular, round, or oval cross-section. An oval cross-section is preferred for reasons hereinabove given, and, in addition, an oval cross-section provides for optimum resiliency and spring-like qualities of the hook portion. When the hook portion has a round cross-section, the diameter of the hook portion preferably is about 40% of the width or diameter of the shaft portion.

In a preferred embodiment, when the fastener is inserted into a hole, the end of the hook portion is bent back towards the shaft in a manner such that an inner surface of the end portion abuts against the shaft portion to thereby reinforce and increase the gripping power or strength of such end portion against the wall of a hole.

The hook portion includes at least one gripping means for gripping a substrate. The at least one means for gripping a substrate may be at least one serration.

In yet another embodiment, the fastener may include a coating in an amount effective to prevent corrosion of the fastener. Such coating may be one as hereinabove described.

The invention will now be described with respect to the drawings, wherein.

Figure 1:
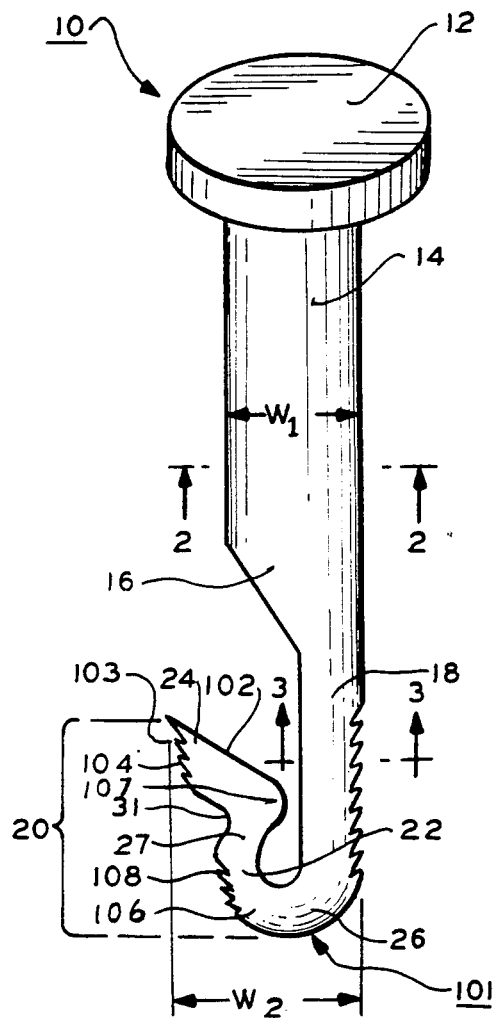
FIG. 1 is a side isometric view of an embodiment of a fastener in accordance with the present invention.
Figure 4:
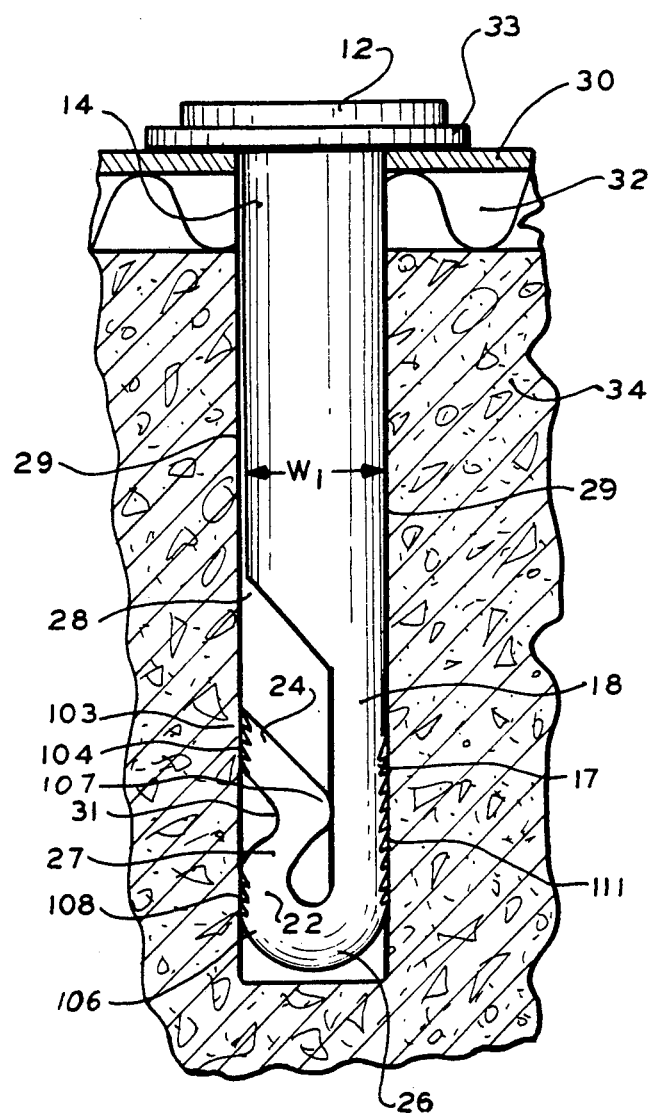
FIG. 4 is a cross-sectional view of the fastener inserted in a hole in a roof deck.
Figure 2:
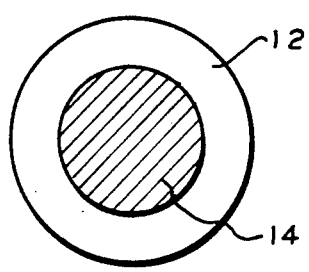
FIG. 2 is a cross-sectional view of the shaft portion of the fastener along lines 2—2 of FIG. 1.
Figure 3:
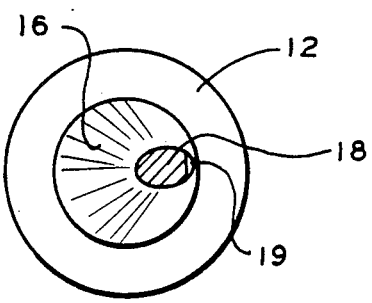
FIG. 3 is a cross-sectional view of the hook portion of the fastener along lines 3—3 of FIG. 1.

Referring now to the drawings, a fastener 10 of the present invention includes a head 12 and a shaft 14. Shaft 14 has a diameter approximately equal to that of a hole in a substrate into which fastener 10 will be inserted. It is to be understood, however, that the width or diameter of the shaft portion can be less than the width or diameter of the hole. Fastener 10 may be made of a material having a high degree of memory as hereinabove described. Substrates may be of materials such as concrete, plaster, stone, or wood. Such substrates may be of high density or low density.

As shown, shaft 14 has a reduced diameter portion 18 and terminates in a hook portion generally indicated as 101. The shaft 14 could be made with a constant width or diameter although a shaft with a tapering portion 16 is shown between the shaft 14 and the reduced diameter portion 18.

The hook portion 101, as shown, includes an upwardly and outwardly extending end portion 102 having a gripping end surface 103, which includes serrations 104. It is to be understood, however, that although serrations are preferred, end surface 103 need not include serrations or could include other means for increasing the gripping surface or ability of the gripping end surface 103.

The gripping end surface 103 is preferably inclined with respect to horizontal, with end portion 102 in an unflexed portion.

The hook portion 101, as shown, includes an outer curved surface 106 and an inner curved surface 107 which form a transition between the bottom part of the hook portion 101 and the end portion 102. As shown, the outer surface 106 is provided with serrations 108 to increase the gripping surface of the outer surface 106. The serrations, although preferred, could be omitted or other means for improving the gripping surface or power of the outer surface 106 may be employed.

The lower outer surface 17 of shaft 14 is also provided with serrations 111 to increase the gripping surface thereof. The serrations 111 could be omitted or other means for improving the gripping surface or power could be employed.

The total width $W_2$ of the fastener 10 at the hook portion 101 thereof is greater (width of hook and shaft) than the width $W_1$ of the fastener above the hook portion (width of the shaft alone).

The end portion 102 is resilient or spring-like whereby when placed under compression (bending of the end portion 102 back towards the main shaft 14) such end portion 102 seeks to maintain its original configuration.

If fastener 10 is made of metal, the memory may be imparted to the hook of fastener 10 by tempering fastener 10 at a temperature sufficient to impart the desired memory.

As an illustrative example of the utility of the fastener 10 of the present invention, fastener 10 is first passed through a stress plate or batten bar 33, and then driven through a roof membrane 30, an insulation layer 32, and into pre-formed hole 28 in roof deck 34. Hole 28 is bounded by a wall 29. Roof deck 34 may be made of concrete, plaster, stone, wood, or other suitable deck materials. In the embodiment shown, shaft 14 has a diameter or width $W_1$ which is approximately equal to the diameter of hole 28. The width $W_2$ is slightly greater than width $W_1$. For example $W_2$ may be about 0.232" and $W_1$ may be about 0.210". Because of the bendability and configuration of the hook 101. one is able to insert fastener 10 through membrane 30 and insulation 32, and into hole 28 with less force than is required for a sleeve anchor, expansion anchor, or an anchor having a deformed shaft. Because less force is required for insertion, one is less likely to cause undesired damage to membrane 30 or to insulation 32 as fastener 10 is being inserted.

As fastener 10 is being inserted into hole 28, the end portion 102 is subjected to compressive force because the width W2, prior to insertion of fastener 10, is greater than the diameter of hole 28. The end portion 102 bends back towards the shaft 14 and a portion of the inner surface 107, adjacent to the end portion 102, is forced back against and into abutment with the shaft 14. In addition, the end surface 103 moves from an inclined position with respect to the longitudinal axis of the shaft 14 to a position essentially parallel to the longitudinal axis of the shaft 14 thereby increasing the area of surface contact between the wall 29 of the hole 28 and the end surface 103. Furthermore, the portion of the outer curved surface 106, which includes serrations 108, is also bent back slightly towards the shaft 14.

Fastener 10 is driven into hole 28 until the head 12 is in contact with the stress plate 33, thereby pressing membrane 30 and insulation 32 against roof deck 34. Once the insertion is complete, although compressed the end portion 102, will seek to return and expand to the original configuration due to the memory of the hook portion 101. As a result thereof, serrations 111 of surface 17, serrations 104 of end surface 103, and serrations 108 of surface 106 grip wall 29 of hole 28. The extension of hook second portion 27 upwardly from hook first portion 22 and inwardly toward downwardly depending portion 18, and the disposition of hook third portion 24 at an angle to and upwardly and outwardly from second portion 27, aids in the expansion of the hook 101 and enables the hook to dig into wall 29 of hole 28 as the fastener 10 is put under load. The hook third portion 24 also aids in digging into both high and low density materials. The expansion of the hook 101 and the gripping of the wall 29 of hole 28 by serrations 111, 104 and 108 enable the fastener 10 to be firmly anchored within hole 28, thus enabling membrane 30 and insulation 32 to be securely fastened by the stress plate 33 to roof deck 34.

For purposes of further explanation, serrations 111, 104 and 108 provide more surface area for the hook 101 to dig into wall 29 of hole 28. As serrations 111, 104 and 108 dig into wall 29, there is an upward pull on shaft 14 and downwardly depending portion 18. As the fastener 10 is driven into the hole 28, the hook portion 101 will scrape the wall 29 slightly. Such scraping may cause slight ledges in wall 29. These ledges may add further to the holding capability of the fastener 10. If one pulls up the fastener 10 up, the force of wall 29 on the hook 101 and serrations 111, 104 and 108 will hold the fastener 10 in place. In addition, the portion of rear surface 10 which abuts against the shaft portion 18 forces serrations 111 against wall 29 of hole 28. As shaft 14 attempts to rise, the hook 101 expands, and serrations 111, 104 and 108 dig in further into wall 29. The force of shaft 14 and downwardly depending portion 18 against the portion of wall 29 opposite the portion of wall 29 contacted by the hook portion 101 is also increased, thus aiding further in the retention of fastener 10 within hole 28.

If during installation of the fastener 10 in hole 28, a portion of the wall 29 becomes chipped by the hook, the hook can expand within the wider portion of hole 28 formed by the chipping of wall 29, whereby downwardly depending portion 18 and the hook portion 101 will continue to contact wall 29 and serrations 104, 108 and 111 will grip the interior of the hole 28, thus continuing to provide for adequate anchoring of fastener 10 within hole 28 of roof deck 34. This expansion is aided by the disposition of end portion 102 at an angle to and upwardly and outwardly from the main shaft 14, as hereinabove described.

Advantages of the present invention include the ease of insertion of the fastener into a hole in the substrate due to the decreased cross-sectional area of the anchoring portion, or, when the fastener includes a hook, the configuration and bendability of the hook enable one to insert the fastener easily into a hole in a substrate. This ease of insertion is especially important when the fastener is inserted through a soft material (e.g., roof membranes and/or roofing insulation) prior to insertion into a hole in a substrate made of a hard material (e.g., a roof deck made of concrete). Less force is required to insert the fastener, which lessens the chance of damage to any soft material(s) overlying the substrate.

The serrations which may be included in the anchoring portion or the hook portion serve to grip the wall of the hole in the substrate and dig into the substrate, thus making the fastener difficult to remove from the hole. When the fastener includes a hook having a width, as hereinabove described, which is greater than the width of the shaft portion, the memory of the hook will cause the hook to expand in an attempt to return to its original configuration. This expansion will cause the hook to press against the wall of the hole and thus effectively securing the hook within the hole through such pressure, and in addition, such pressure may be complemented by the gripping of the wall by serrations which may be present on the hook. In addition, if portion(s) of the wall are chipped during insertion of the fastener, the memory of the hook may cause the hook to expand further into the void(s) left by the chipping, and enable the hook and serrations to contact the substrate and expand against and grip the substrate. Thus, the fastener will remain firmly secured within the substrate even if there is chipping of the wall of the hole.

The expansion of the hook and/or the gripping of the serrations enable the anchor to remain firmly secured within the substrate. A considerably greater force is required to remove such a fastener than is necessary to insert the fastener. When the fastener is employed to fasten a roof membrane and/or insulation to a roof deck, the fastener, which is firmly anchored within the substrate, provides effective resistance against wind uplift of the roof membrane, whereby wind uplift which could cause dislodging of the fastener is prevented.

It is to be understood that the scope of the present invention is not to be limited to the specific embodiments described above. Numerous modifications may be made within the scope of the invention, and, within the scope of the accompanying claims, the invention may be practiced other than as particularly described.

What is claimed is:

1. A one-piece fastener comprising:
   a head portion;
   a shaft portion; and
   a hook portion, said hook portion including a resilient end portion having an end surface for providing gripping contact with a wall of a hole in a substrate, said end portion extending upwardly toward said head portion and angularly outwardly from the shaft portion, said end portion being resilient for flexing by a wall of a hole to effect said gripping contact; and an inner curved surface and an outer curved surface, wherein upon insertion of said fastener into a hole, said end portion bends back toward said shaft portion and a portion of said inner curved surface is forced back against and into abutment with said shaft portion.

2. The fastener of claim 1 wherein said end surface includes at least one serration for providing gripping contact with a wall of a hole in a substrate.

3. A fastener comprising:
a head portion;
a shaft portion; and
a hook portion, said hook portion including an upwardly and outwardly extending end portion, said hook portion being capable of exerting a sufficient force against the wall of a hole in a substrate so as to enable said fastener to be anchored within said hole, said end portion being resilient for flexing by a wall of a hole to effect said force; and an inner curved surface and an outer curved surface, wherein upon insertion of said fastener into a hole, said end portion bends back toward said shaft portion and a portion of said inner curved surface is forced back against and into abutment with said shaft portion.

4. The fastener of claim 3 wherein said end portion includes an end surface, said end surface including at least one serration for providing gripping contact with a wall of a hole in a substrate.

* * * * *